United States Patent
Imazawa et al.

(10) Patent No.: US 10,614,391 B2
(45) Date of Patent: Apr. 7, 2020

(54) METHOD AND APPARATUS FOR WORK QUALITY CONTROL

(71) Applicant: Hitachi, Ltd., Tokyo (JP)

(72) Inventors: Kei Imazawa, Tokyo (JP); Yuichi Hamamura, Tokyo (JP); Shigenori Tanaka, Tokyo (JP); Kouichirou Tada, Tokyo (JP); Isamu Momose, Tokyo (JP); Yusaku Fukaya, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 768 days.

(21) Appl. No.: 14/963,502

(22) Filed: Dec. 9, 2015

(65) Prior Publication Data
US 2016/0253618 A1 Sep. 1, 2016

(30) Foreign Application Priority Data

Feb. 26, 2015 (JP) ................................. 2015-036031

(51) Int. Cl.
*G06Q 10/06* (2012.01)
*G06K 9/00* (2006.01)
(Continued)

(52) U.S. Cl.
CPC . *G06Q 10/063114* (2013.01); *G06K 9/00771* (2013.01); *G06K 9/6284* (2013.01);
(Continued)

(58) Field of Classification Search
None
See application file for complete search history.

(56) References Cited

U.S. PATENT DOCUMENTS 5,590,268 A * 12/1996 Doi ..................... G06F 17/5009
345/419
7,864,980 B2 1/2011 Evans
(Continued)

FOREIGN PATENT DOCUMENTS

CN 103218628 A 7/2013
JP 2010-211626 A 9/2010
(Continued)

OTHER PUBLICATIONS

Tanaka et al., "Motion planning with worker's trajectory prediction for assembly task partner robot", 2012 IEEE/RSJ International Conference on Intelligent Robots and Systems, pp. 1525-1532 (Year: 2012).*

(Continued)

*Primary Examiner* — Ivan R Goldberg
*Assistant Examiner* — Sarjit S Bains
(74) *Attorney, Agent, or Firm* — Mattingly & Malur, PC (57) ABSTRACT

A method for work quality control of a worker in work where repetitive operation is performed which includes: a model construction step of statistically constructing, from past path data of the worker, past intermediate quality data on a product to be subjected to the work, and past final quality data on the product to be subjected to the work, a prediction model that receives the path data and the intermediate quality data and outputs the final quality data; a worker position recognition step of recognizing a position of the worker from image data on the work captured; and an unusual worker position determining step of substituting the position of the worker recognized in the worker position recognition step into the model constructed in the model construction step, to determine whether the position of the target worker is a usual one or an unusual one.

8 Claims, 11 Drawing Sheets

(51) Int. Cl.
*G06T 7/77* (2017.01)
*G06K 9/62* (2006.01)
*G06T 7/73* (2017.01)

(52) U.S. Cl.
CPC ..... *G06K 9/6296* (2013.01); *G06Q 10/06395* (2013.01); *G06T 7/73* (2017.01); *G06T 7/77* (2017.01); *G06T 2207/20076* (2013.01); *G06T 2207/30196* (2013.01)

(56) References Cited

U.S. PATENT DOCUMENTS

| | | | |
|---|---|---|---|
| 8,180,105 B2 | 5/2012 | Cobb et al. | |
| 8,285,060 B2 | 10/2012 | Cobb et al. | |
| 8,660,368 B2 | 2/2014 | Datta et al. | |
| 2006/0109341 A1* | 5/2006 | Evans | G06K 9/00771 348/14.08 |
| 2006/0111811 A1* | 5/2006 | Okamoto | B25J 5/007 700/214 |
| 2008/0166015 A1* | 7/2008 | Haering | G01S 3/7864 382/103 |
| 2009/0021351 A1* | 1/2009 | Beniyama | G05D 1/024 340/10.1 |
| 2009/0201149 A1* | 8/2009 | Kaji | G01C 21/20 340/539.13 |
| 2010/0302041 A1* | 12/2010 | Malik | G08B 21/04 340/573.1 |
| 2011/0052000 A1* | 3/2011 | Cobb | G06K 9/00335 382/103 |
| 2012/0237081 A1* | 9/2012 | Datta | G06K 9/00778 382/103 |
| 2013/0030873 A1* | 1/2013 | Davidson | G06Q 10/06 705/7.36 |
| 2013/0286198 A1* | 10/2013 | Fan | G06K 9/00785 348/143 |
| 2014/0083058 A1* | 3/2014 | Issing | B65G 1/1378 53/473 |
| 2014/0232828 A1* | 8/2014 | Sahadeo | G01P 13/00 348/47 |
| 2014/0277596 A1* | 9/2014 | Nixon | G05B 11/01 700/17 |
| 2015/0131856 A1* | 5/2015 | Matsunaga | F16P 3/142 382/103 |
| 2015/0142138 A1* | 5/2015 | Mohan | G05B 19/048 700/20 |
| 2015/0167461 A1* | 6/2015 | Sugihara | G06Q 50/02 299/1.05 |

FOREIGN PATENT DOCUMENTS

| | | | | |
|---|---|---|---|---|
| JP | 2013-25578 A | 2/2013 | | |
| WO | 2010/123342 A2 | 10/2010 | | |
| WO | WO-2010123342 A2 * | 10/2010 | ......... | G06K 9/00335 |

OTHER PUBLICATIONS

Extended European Search Report received in corresponding European Application No. 16152023.4 dated Jun. 14, 2016.

Communication Pursuant to Article 94(3) EPC received in corresponding European Application No. 16 152 023.4 dated Sep. 28, 2017.

Chinese Office Action received in corresponding Chinese Application No. 201610006947.2 dated Mar. 15, 2018.

* cited by examiner

FIG. 2

| FRAME NO. | CENTER OF GRAVITY | | HEAD | | SHOULDER | | ELAPSED TIME |
|---|---|---|---|---|---|---|---|
| | X COORDINATES | Y COORDINATES | X COORDINATES | Y COORDINATES | X COORDINATES | Y COORDINATES | |
| 1 | 36 | 58 | 77 | 39 | 90 | 92 | 20sec |
| 2 | 95 | 10 | 59 | 65 | 61 | 91 | 21sec |
| 3 | 5 | 5 | 65 | 68 | 42 | 81 | 22sec |
| 4 | 66 | 33 | 57 | 61 | 5 | 17 | 23sec |
| 5 | 79 | 92 | 93 | 34 | 23 | 30 | 24sec |
| 6 | 41 | 33 | 28 | 80 | 55 | 87 | 25sec |
| 7 | 96 | 77 | 87 | 45 | 79 | 35 | 26sec |
| 8 | 32 | 9 | 0 | 57 | 62 | 4 | 27sec |
| 201 | 202 | 203 | 204 | 205 | 206 | 207 | 208 |

FIG. 3

| PRODUCT ID | QUALITY DATA 1 | QUALITY DATA 2 | QUALITY DATA 3 |
|---|---|---|---|
| 1 | 9 | 3 | 3 |
| 2 | 5 | 2 | 3 |
| 3 | 7 | 6 | 6 |

FIG. 4

| PRODUCT ID | TO PRODUCT ID = 1 | TO PRODUCT ID = 2 | TO PRODUCT ID = 3 |
|---|---|---|---|
| 1 | 0 | 1 | 2 |
| 2 | 1 | 0 | 3 |
| 3 | 2 | 3 | 0 |

FIG. 5

|  | DISTANCE-TO-PRODUCT-ID=1 | ... | DISTANCE-TO-PRODUCT-ID=p | INTERMEDIATE QUALITY DATA ITEM 1 | ... | INTERMEDIATE QUALITY DATA ITEM q | FINAL QUALITY DATA |
|---|---|---|---|---|---|---|---|
| DISTANCE-TO-PRODUCT-ID=1 | 0 | ... | 0 | 1 | ... | 1 | 0 |
| ... | ... | ... | ... | ... | ... | ... | ... |
| DISTANCE-TO-PRODUCT-ID=p | 0 | ... | 0 | 1 | ... | 1 | 0 |
| INTERMEDIATE QUALITY DATA ITEM 1 | 1 | ... | 0 | 0 | ... | 0 | 1 |
| ... | ... | ... | ... | ... | ... | ... | ... |
| INTERMEDIATE QUALITY DATA ITEM q | 1 | ... | 1 | 1 | ... | 0 | 0 |
| FINAL QUALITY DATA | 1 | ... | 0 | 0 | ... | 0 | 0 |

FIG. 6

|  |  | PARENT NODE 602 | | | |
|---|---|---|---|---|---|
|  |  | Bin1 | Bin2 | ... | Binl |
| TARGET NODE 601 | Bin1 | 0.24 | 0.39 |  | 0.37 |
|  | Bin2 | 0.22 | 0.38 |  | 0.40 |
| NODE | ⋮ | ⋮ | ⋮ | ⋮ | ⋮ |
|  | Bink | 0.74 | 0.24 |  | 0.02 |

603 CONDITIONAL PROBABILITY

| WORK STATUS | AT-WORK | ~801 |

METHOD AND APPARATUS FOR WORK QUALITY CONTROL

INCORPORATION BY REFERENCE

The present application claims priority from Japanese application No. 2015-036031 filed on Feb. 26, 2015, the content of which is hereby incorporated by reference into this application.

BACKGROUND OF THE INVENTION

1. Field of the Invention

The present invention relates to a method and an apparatus for work quality control.

2. Description of Related Art

Related arts in the present technical field include JP-A-2010-211626. JP-A-2010-211626 describes that a path monitoring system includes an image capturing device 200 that generates time-series captured-image data obtained by capturing first and second mobile objects conveyed by a conveyance device, feature point extraction means 140 that extracts a position of a feature point of the first mobile object in a time-series manner from the time-series captured-image data, time-series position coordinate calculation means 150 that calculates time-series position coordinates of the second mobile object on a reference coordinate with the first mobile object made standing still, based on a relative position of the second mobile object with respect to the feature point of the first mobile object, the relative position being calculated from the time-series captured-image data, and a data accumulation unit 170 that accumulates time-series position coordinates of the second mobile object on the reference coordinate.

BRIEF SUMMARY OF THE INVENTION

JP-A-2010-211626 describes a technique to acquire a path of a mobile object from captured-image data. However, the technique of JP-A-2010-211626 does not enable determination of whether the acquired path is a usual one or an unusual one.

An objective of the present invention is to determine automatically whether a work status of each worker is a usual one or an unusual one, from images of a workplace that is characterized by repeating the same work.

To solve the above problem, a method set forth in the claims is employed, for example.

As representative means, there is a method of statistically modelling a relationship between position (main body position or joint position) data on a worker acquired from captured-image data and a quality check result and by substituting position data on a determination target or joint position data into a model, determining whether a path is a usual one or an unusual one.

According to the present invention, in a workplace that is characterized by repeating the same work, it is possible to determine automatically whether a work status of each worker is a usual one or an unusual one.

Other problems, structures, and effects will be apparent from the following description of embodiments.

DETAILED DESCRIPTION OF THE INVENTION

Hereinafter, embodiments will be described with reference to the drawings.

Figure 1:
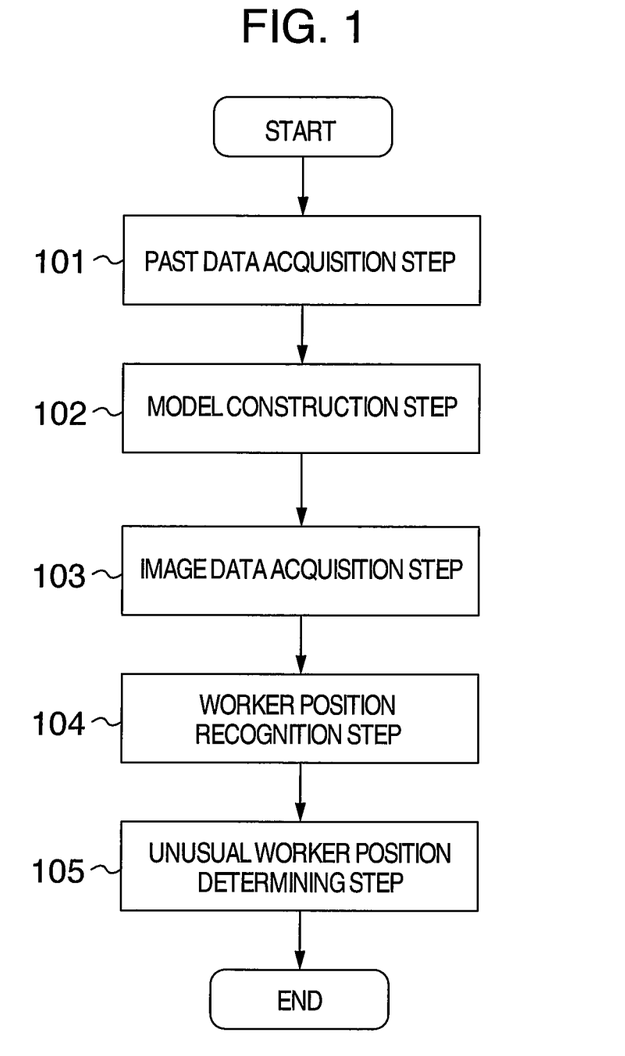
FIG. 1 is a process flow diagram of a method for work quality control.

FIG. 1 is a process flow diagram of a method and an apparatus of work quality control.

The present embodiment includes: a past data acquisition step 101 of acquiring past path data, intermediate quality data, and final quality data, the intermediate quality data being obtained through a numerical inspection conducted on each work item before the completion of a product, the final quality data used for determining, after the completion of the product, whether the product can be shipped as a product or not; a model construction step 102 of constructing a statistical model from the acquired past data; an image data acquisition step 103 of acquiring data on images captured with a device such as a camera (a movie or consecutive still images acquired at predetermined intervals); a worker position recognition step 104 of recognizing a worker contained in the image data, and acquiring positional information on the worker; and an unusual worker position determining step 105 of substituting path data that is positional information obtained by the recognition in the worker position recognition step (path data on the worker as a whole such as a center of gravity or path data on a part of a body of the worker such as a head or a joint (e.g., a shoulder, elbow, or knee)) into a model constructed in the model construction step 102, to determine whether the position of the worker is a usual one.

In the past data acquisition step 101, path data obtained through past recognitions, past intermediate quality data, and past final quality data are acquired.

Figure 2:
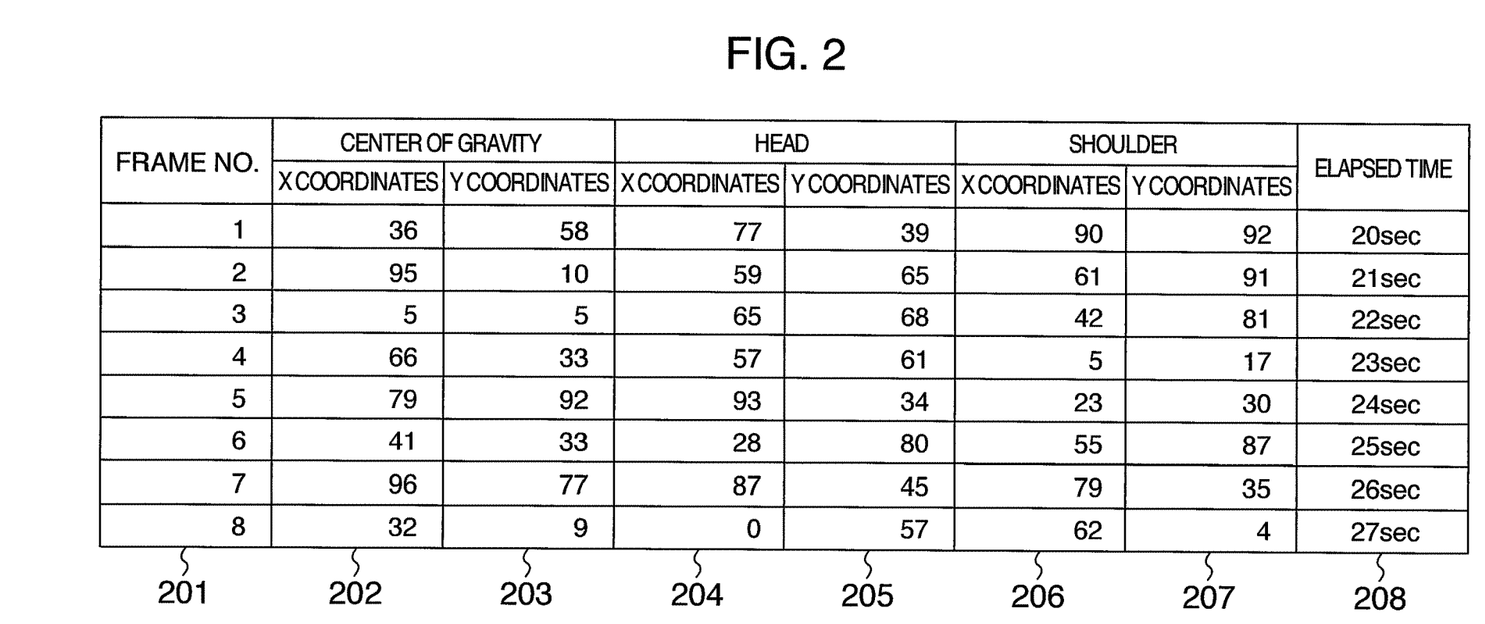
FIG. 2 illustrates an example of past path data.

FIG. 2 illustrates an example of the past path data that is acquired in the above past data acquisition step 101.

Reference numeral 201 denotes a frame No of a target image data item. Reference numerals 202 to 207 denotes acquired XY coordinates of the gravity center, a position of a head, a position of a shoulder of a worker, respectively. Reference numeral 208 denotes a time of the target piece of image data elapsing from a work start.

Figure 3:
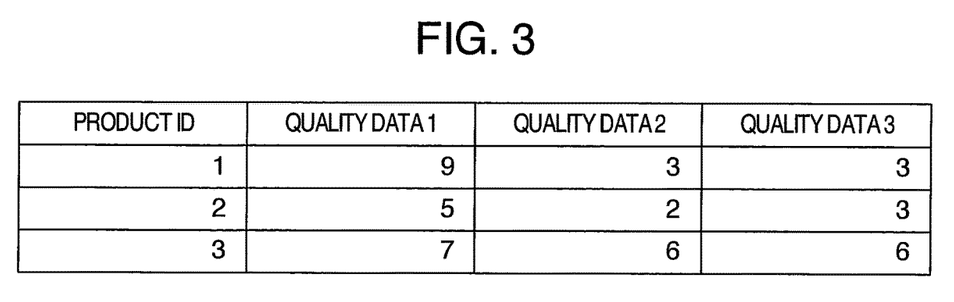
FIG. 3 illustrates an example of quality data.

FIG. 3 illustrates an example of quality data. In the above past data acquisition step 101, the intermediate quality data, and the final quality data are acquired in the form of this table. The first column refers to a product ID to identify a product, and the second and the subsequent columns refer to quality data.

In the model construction step 102, on the basis of the past data acquired in the above past data acquisition step 101, a statistical model is constructed that takes the path data and the intermediate quality data as inputs and predicts final quality data as an output and the statistical model is stored in a DB unit 901. This processing is performed by a statistical model construction engine, which will be described later.

The path data is converted into a distance matrix because the path data differs in length among different product IDs.

Figure 4:
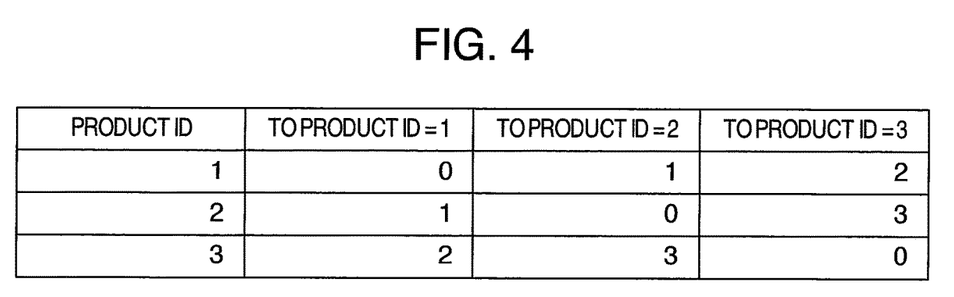
FIG. 4 illustrates an example of a distance matrix.

FIG. 4 illustrates an example of the distance matrix. The first column refers to product ID. In addition, for example, an element in the second row and the third column of the table in FIG. 4 represents a distance between path data on a worker with respect to a product ID1 and path data with respect to a product ID2. Examples of the distance include Gromov-Hausdorff distance.

Next, a matrix is created that contains the distance matrix, the intermediate quality data, and the final quality data combined in a column direction with a product ID as a key, to construct a statistical model. Examples of the statistical model include a Bayesian Network. A Bayesian Network refers to a directed network having conditional probabilities.

Figure 5:
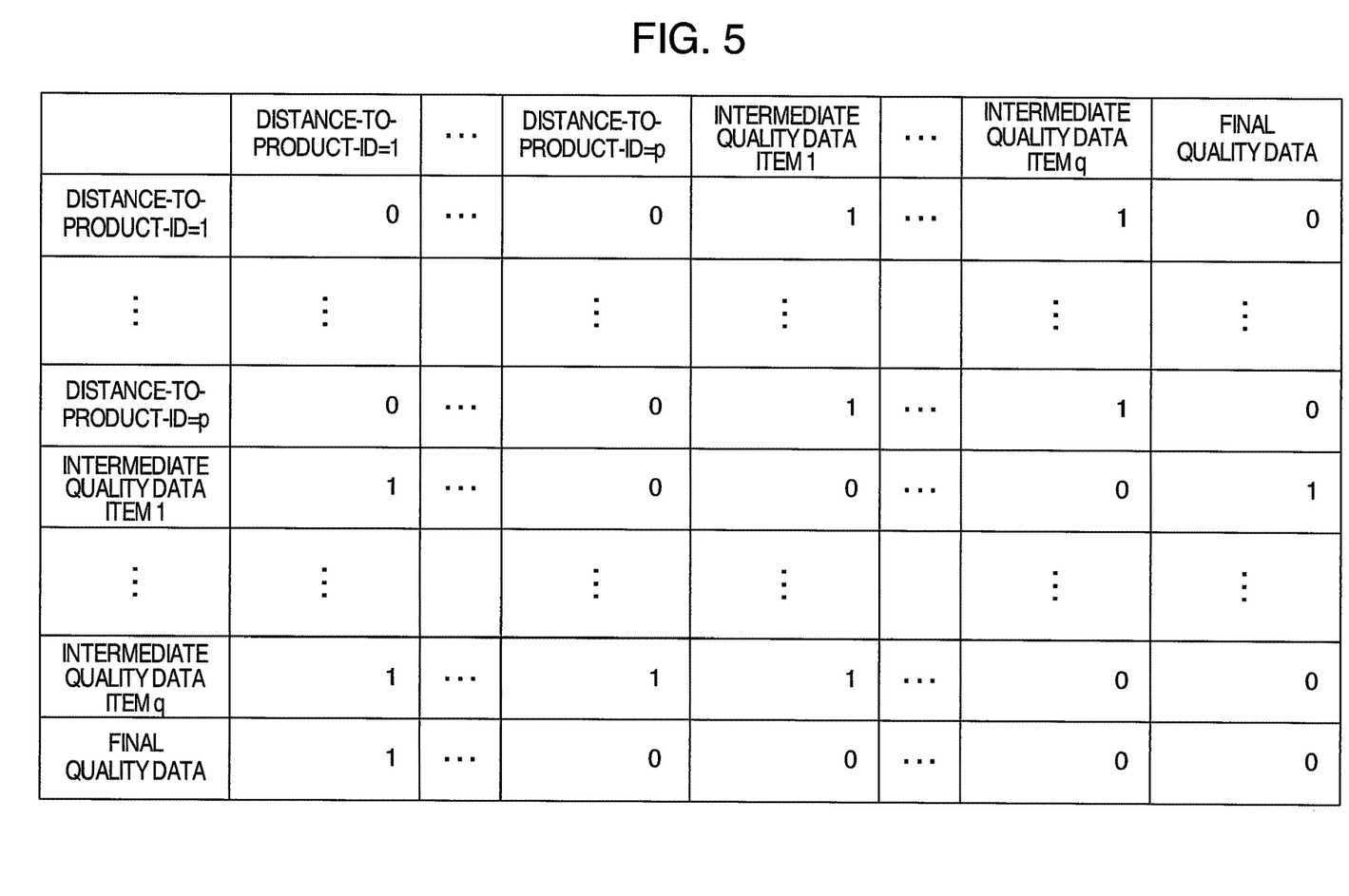
FIG. 5 illustrates an example in which a network structure in a Bayesian Network is stored.

FIG. 5 illustrates an example in which a network structure in a Bayesian Network is stored. A row direction represents child nodes, and a column direction represents parent nodes. For example, a value of 1 at the second row and the fifth column indicates that a parent-child relationship exists between a distance-to-product-ID=1 and an intermediate quality data item 1. That is, the intermediate quality data item 1 and the distance-to-product-ID=1 are connected by an edge, which is directed to have the intermediate quality data item 1 as a root and the distance-to-product-ID=1 as a destination.

Figure 6:
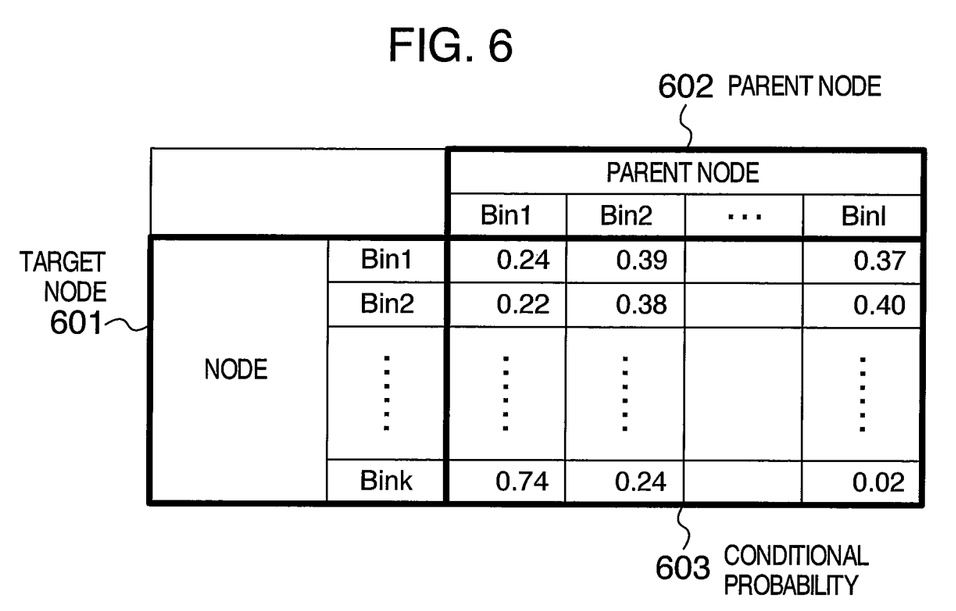
FIG. 6 illustrates an example in which conditional probabilities in the Bayesian Network.

FIG. 6 illustrates an example of conditional probabilities in a Bayesian Network. A target node 601 and a parent node 602 each refer to a target node. A number written in a conditional probability 603 denotes a value of a probability.

The image data acquisition step 103 is a step of acquiring image data from an electronic device such as a camera installed in the workplace, or database of image data that is acquired in the past. Available electronic devices include a camera, and a 3D camera that uses a camera image and data from a depth sensor in combination.

Methods of acquiring the image data include one in which only one frame of the latest image is acquired from the electronic device, and one in which, a plurality of frames are acquired together with image data that is acquired in the past and saved in the database.

The worker position recognition step 104 is a step of searching for a worker captures in the acquired image data, and acquiring a XY coordinates of a gravity center, a position of a head, and a position of a shoulder of the worker captured in the image data, and a time elapsing from a work start.

Methods of searching for a worker include a method of using a model to determine whether the worker is captured or not based on the image data with a machine learning technology, the model being constructed in advance by inputting image data containing the worker captured therein and image data not containing the worker captured into a computer, and a method of comparing images of a plurality of frames and extracting a moving object, which is considered to be the worker (the main body of the worker or a part of a body of the worker).

Methods of acquiring the time elapsing from the work start include one to acquire work start and work end time points from a start-end history of a manufacturing system in a factory, and to compare the work start and work end time points with time points when the image data is acquired from an electronic device, and one to presume details of the work from the image data to acquire the time elapsing from the work start.

The unusual worker position determining step 105 is a step of substituting the positional information on the worker recognized in the worker position recognition step 104 into the prediction model constructed in the model construction step 102 to determine whether a position of the worker is a usual one or an unusual one.

For the model of normal position information, there are a method of using normal transition of position data items that is stored in advance, and a method of using a probability distribution that indicates the degree of probability that the worker is present at a given position, the probability distribution being stored in advance based on past position data.

Figure 7:
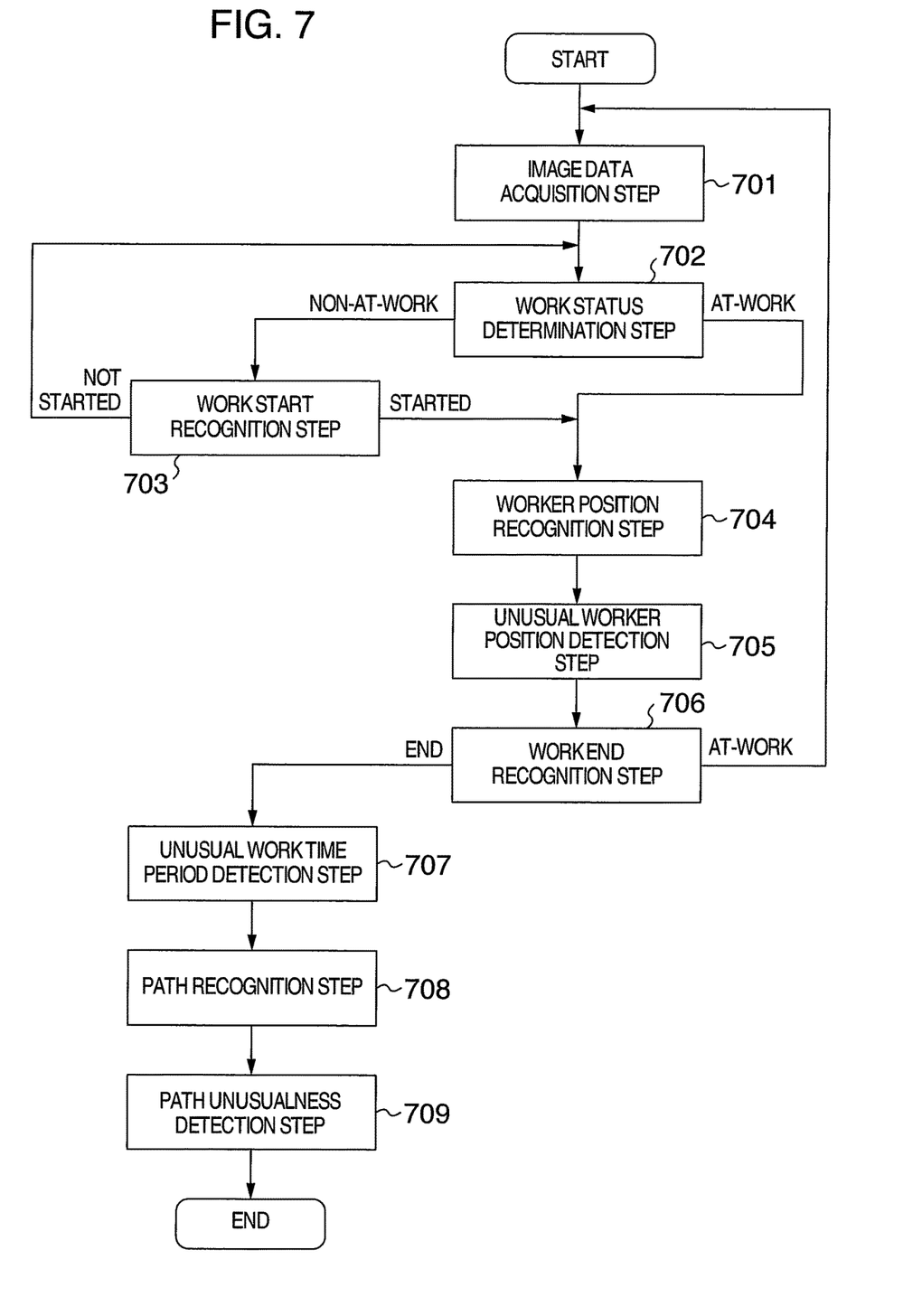
FIG. 7 is a process flow diagram of a second embodiment of the method and an apparatus of work quality control.

FIG. 7 is a process flow diagram illustrating a second embodiment of the method and the apparatus of work quality control.

The flow of processing of the present embodiment includes: an image data acquisition step 701 of acquiring image data from a device such as a camera; a work status determination step 702 of determine whether a work status at that point is at-work or out-of-work; a work start recognition step 703 of recognizing from the acquired image data whether a work item has been started; a worker position recognition step 704 of recognizing a position of the worker; an unusual worker position detection step 705 of determining whether the position of the worker is a usual one or an unusual one; a work end recognition step 706 of recognizing from the acquired image data whether the work has been finished; an unusual work time period detection step 707 of calculating a work time period from the recognized work start and work end time points and recognizing whether the work time period is a usual one or an unusual one; a path recognition step 708 of recognizing positions of the worker between the work start time point and the work end time point, as a path; and a path unusualness detection step 709 of determining whether the recognized path data is unusual or usual.

In the image data acquisition step 701, processing similar to the processing in the past data acquisition step 101 in FIG. 1 is performed.

In the work status determination step 702, a work status flag stored in a memory is accessed, and information on whether the work status is at-work or out-of-work is acquired.

Figure 8:
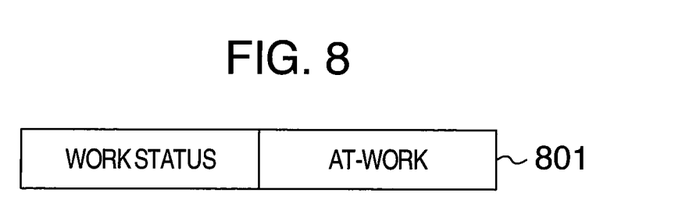
FIG. 8 illustrates an example of a work status flag.

FIG. 8 illustrates an example of the work status flag. In a work status flag 801, information on being at-work is saved. Methods of storing information that indicates being out-of-work include a method of holding information on being non-at-work.

In the work status determination step 702, the processing proceeds to the worker position recognition step 704 if the work status flag is at-work, or the processing proceeds to the work start recognition step 703 if the work status flag is out-of-work. These processes are performed by the work status determination engine.

In the work start recognition step 703, whether the work has been started is determined from transition of feature quantities of individual images in a plurality of frames of past images. If the work has not been started, the processing returns to the work status determination step 702. If the work has been started, the processing proceeds to the worker position recognition step 704. Note that the determination is made by the work start determination engine to be described later with a work start determination model to be described later. Methods for the determination with the work start determination model include a method of comparing the transition of feature quantities in the plurality of frames of past images and a threshold value that is set in advance, to recognize the work start, and a method of constructing a prediction model used to predetermine whether the work status is at-work or not from the transition of feature quantities in the plurality of frames of past images and data on whether the work status is at-work or not at each time point, with a machine learning technology.

In the worker position recognition step 704, the process similar to the process of the worker position recognition step 104 in FIG. 1 is performed. The process is performed by the worker position recognition engine to be described later.

The unusual worker position detection step 705 is a step of comparing positional information on the worker recognized in the worker position recognition step 704 with a usual position information model that is set in advance, to determine whether the position of the worker is a usual one or an unusual one. The process is performed by the unusual worker position detection engine to be described later with an unusual worker position detection model.

For the usual position information model, there are a method of using normal transition of position data (normal path) that is stored in advance, and a method of using a probability distribution that indicates what probability of the worker being present at what position, the probability distribution is stored in advance based on past position data. In the work end recognition step 706, whether the work has been ended is determined from the transition of feature quantities of individual images in the plurality of frames of past images. If it is determined the work has not been ended, the processing returns to the image data acquisition step 701. If it is determined that the work has been ended, the processing proceeds to the unusual work time period detection step 707. The determination is performed by the work end determination engine to be described later with a work end determination model to be described later. Methods for the determination include a method of comparing the transition of feature quantities in the plurality of frames of past images and a threshold value that is set in advance, to recognize the work end, and a method of constructing a prediction model used to predetermine whether the work status is at-work or not from the transition of feature quantities in the plurality of frames of past images and data on whether the work status is at-work at each time point, with a machine learning technology.

For the unusual work time period detection step 707, there is a method, for example, in which a work time period is acquired from a difference between the work start time point recognized in the work start recognition step 703 and the work end time point recognized in the work end recognition step 706, compared with the threshold value that is set in advance, and defining a difference between the work time period and the threshold value as an unusualness degree, the work time period having an unusualness degree of a certain value or more is determined to be an unusual one, or the work time period having an unusualness degree less than the certain value is determined to be a usual one. The unusualness degree may be displayed as will be described later. The processes are performed by an unusual work time period detection engine to be described later with an unusual work time period detection model to be described later.

In the path recognition step 708, path data on each worker is generated based on a worker position recognized in the worker position recognition step 704 at each time point. The generation of the path data is performed by a path recognition engine to be described later with a path detection model to be described later.

Methods of generating the path data includes a method of estimating a path by predicting worker positions at a time point t+1 based on worker positions at a time point t−1 and a time point t and considering a worker position that is the closest to the work position at the time point t of the predicted worker positions to be the position of the worker at the time point t+1. Methods of predicting the position at the time point t+1 include, for example, a state space model.

The path unusualness detection step 709 is a step of determining whether the path recognized in the path recognition step 708 is a usual one or an unusual one. The determination is made by a path unusualness detection engine to be described later with a path unusualness detection model to be described later.

Methods for the determination include a method of calculating a difference between data on the recognized path and normal path data that is set in advance and comparing the difference with a threshold value that is set in advance.

At this point, methods of calculating the difference include Gromov-Hausdorff distance and the like.

In addition, the other unusualness determination methods include a method of embedding a path data item into a space where a point represents a path data item, embedding past path data items into the space by similar embedding mapping, estimating a probability distribution, and calculating an occurrence probability of a path of an unusualness determination object.

Methods of the embedding include a method of embedding path data items into a space that is metrized by introducing a Gromov-Hausdorff distance in a set where a point represents a one-dimensional manifold.

Figure 9:
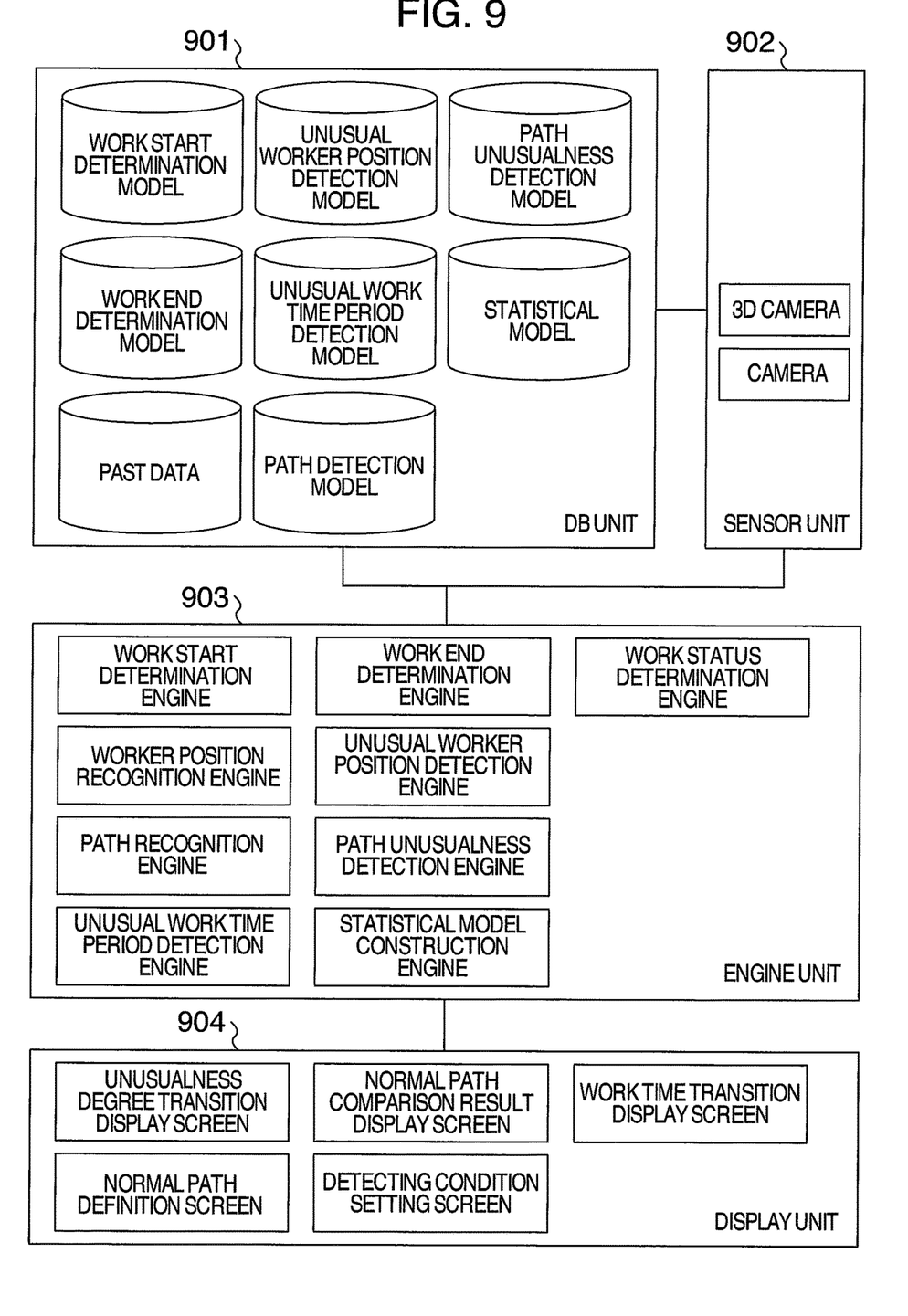
FIG. 9 is a block diagram in an example of the second embodiment of the method and the apparatus of work quality control.

FIG. 9 illustrates a block diagram of an example of the second embodiment of the method and the apparatus of work quality control.

The DB unit 901 includes the work start determination model, the unusual worker position detection model, the work end determination model, the unusual work time period detection model, the path detection model, the path unusualness detection model, and the past data and is connected to the sensor unit 902 and the engine unit 903 over a network.

The sensor unit 902 includes a camera and a 3D camera and is connected to the DB unit 901 and the engine unit 903 over the network.

The engine unit 903 includes the work start determination engine, the work end determination engine, the work status determination engine, the worker position recognition engine, the unusual worker position detection engine, the path recognition engine, the path unusualness detection engine, the unusual work time period detection engine, and the statistical model construction engine and is connected to the DB unit 901, the sensor unit 902, and a display unit 904 over the network.

The display unit 904 includes an unusualness degree transition display screen, a normal path comparison result display screen, a work time transition display screen, a normal path definition screen, and a detecting condition setting screen and is connected to the engine unit 903 over the network.

Figure 10:
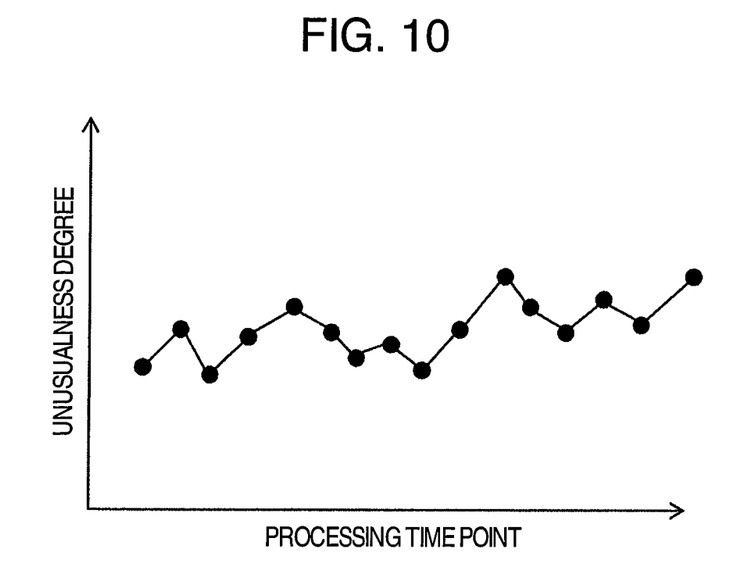
FIG. 10 illustrates an example of an unusualness degree transition display screen.

FIG. 10 illustrates an example of the unusualness degree transition display screen. A horizontal axis represents processing time point, and a vertical axis represents unusualness degree. The horizontal axis may represent process ID rather than processing time point. The unusualness degree represented by the vertical axis is the unusualness degree calculated in the unusual work time period detection step 707.

Figure 11:
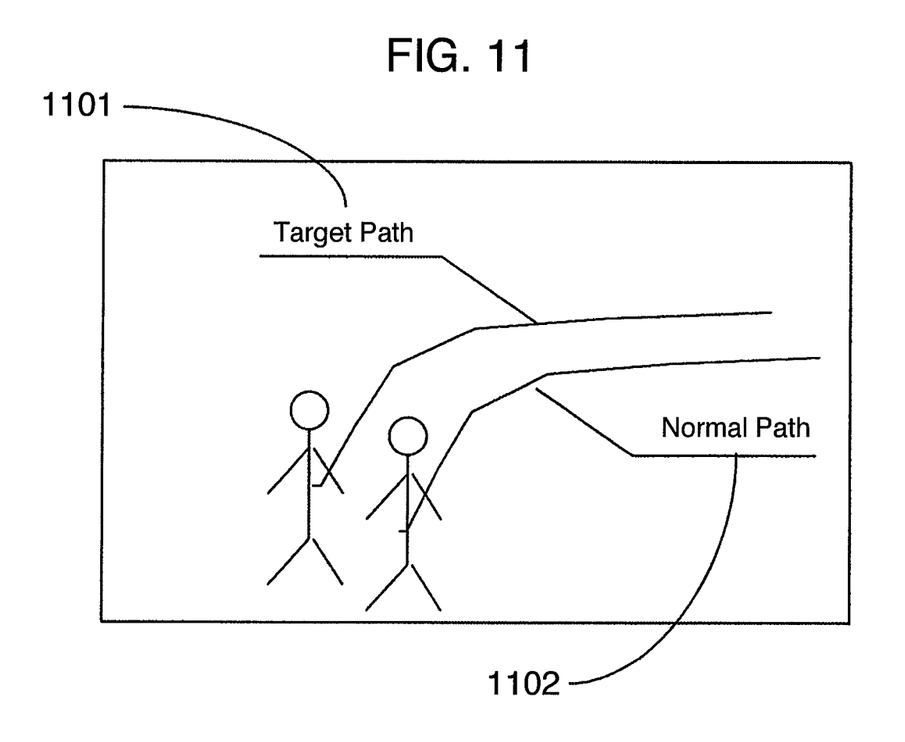
FIG. 11 illustrates an example of a normal path comparison result display screen.

FIG. 11 illustrates an example of the normal path comparison result display screen. FIG. 11 is a diagram on which a path of an unusualness detection target (Target Path) 1101 and a normal path (Normal Path) 1102 are superimposed. The path of the detection target and the normal path are the paths used in the path unusualness detection step 709.

Figure 12:
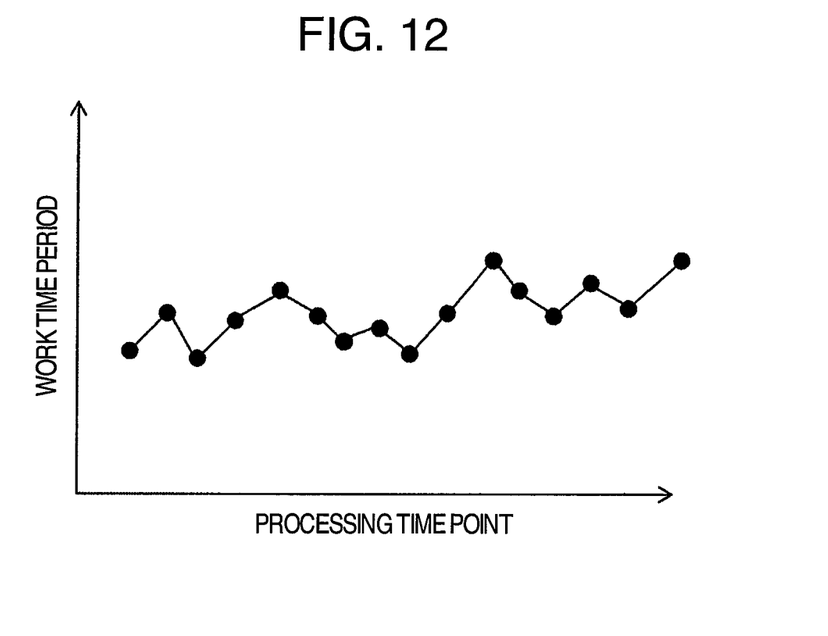
FIG. 12 illustrates an example of a work time transition display screen.

FIG. 12 illustrates an example of the work time transition display screen. A horizontal axis represents processing time point, and a vertical axis represents a work time period taken in each work. The horizontal axis may represent process ID rather than processing time point.

Figure 13:
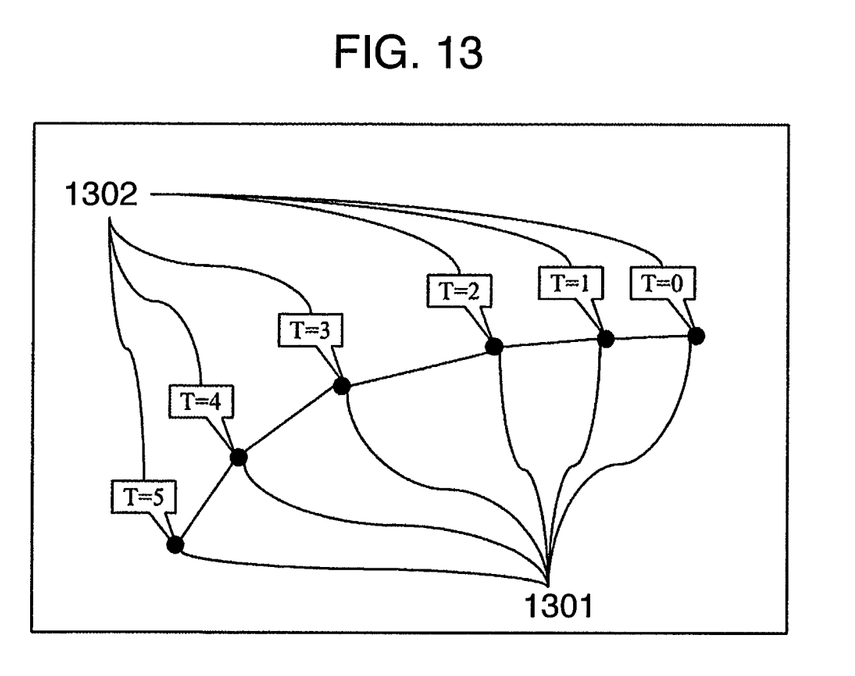
FIG. 13 illustrates an example of a normal path definition screen.

FIG. 13 illustrates an example of the normal path definition screen. The normal path definition screen includes a screen on which nodes 1301 connected by edges can be freely moved by mouse operation. Each node is linked to a time point 1302 at which the node should be observed, and time point information can be also edited by a user. The normal path on the screen is the path used in the path unusualness detection step 709.

Figure 14:
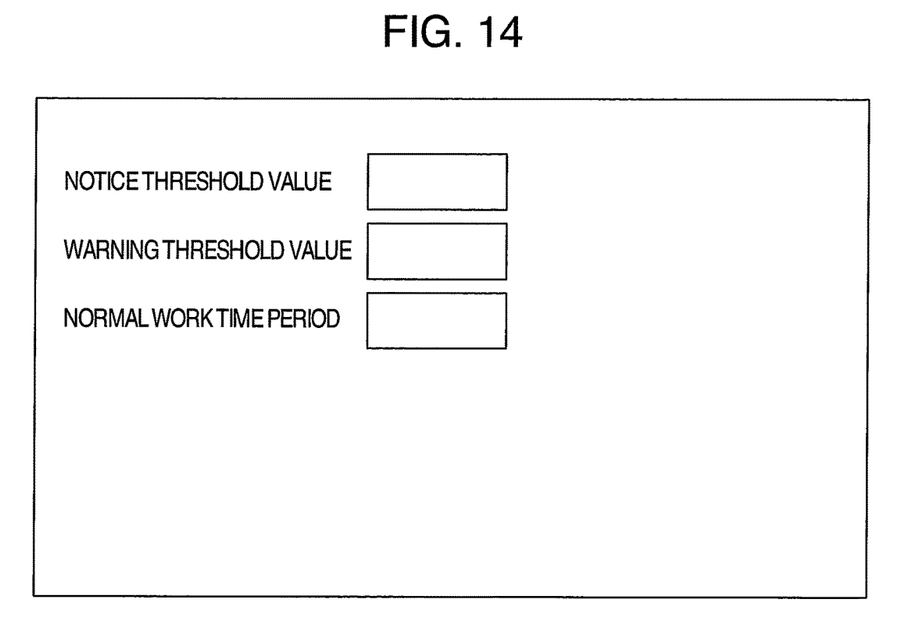
FIG. 14 illustrates an example of a detecting condition setting screen.

FIG. 14 illustrates an example of the detecting condition setting screen. With this screen, notice threshold value, warning threshold value, a normal work time period, and the like can be set.

Figure 15:
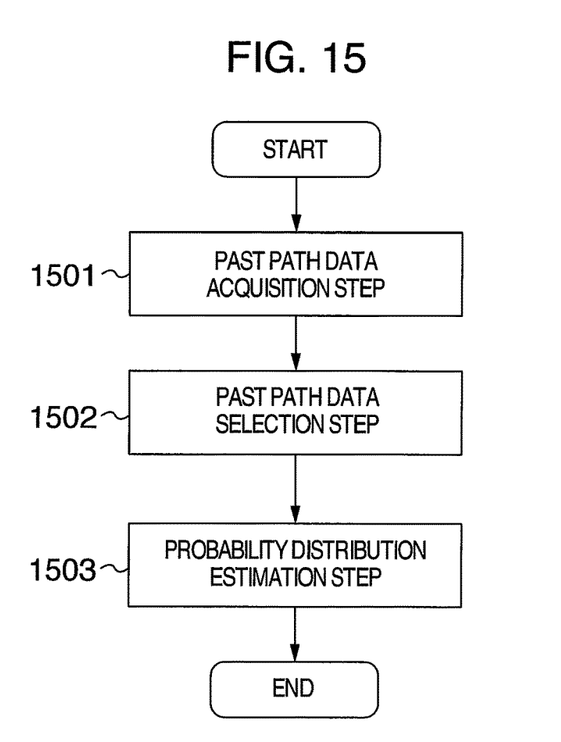
FIG. 15 illustrates a processing method for estimating a probability distribution.

FIG. 15 illustrates a processing method for estimating the probability distribution that is used in the unusual worker position determining step 705 in FIG. 7.

This processing includes a past path data acquisition step 1501 of acquiring past path data, a past path data selection step 1502 of selecting data used for model construction from the past path data, and a probability distribution estimation step 1503 of estimating a probability distribution from the selected data.

In the past path data acquisition step 1501, path data during a period that is specified in advance is acquired.

In the past path data selection step 1502, only a normal path is selected based on work time periods in the acquired data or unusualness detection results.

In the probability distribution estimation step 1503, the probability distribution is estimated from the selected path data. Methods at this point include a method of determining only a distribution family, such as normal distributions in advance, parameters of which are estimated from the data, and non-parametric estimation, such as kernel density estimation, that is not premised on distribution family.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A method for work quality control of a target worker in work where repetitive operation is performed, the method comprising:

a prediction model construction step of acquiring, by a computer, a prediction model that is statistically constructed from past worker path data, including x-coordinates and y-coordinates of a center of gravity, a position of a head and a position of a joint of at least one past worker over at least one past path during at least one past work, past intermediate quality data of the at least one past work, and past final quality data of the at least one past work;

an image data acquisition step of acquiring image data, from a camera to the computer over a network, in which the target worker is captured performing the work, the image data including a plurality of frames;

a worker position recognition step of recognizing, by the computer, a plurality of positions of the target worker, including x-coordinates and y-coordinates of a center of gravity, a position of a head and a position of a joint of the target worker during target work, from the image data;

an unusual worker position determining step of substituting, by the computer, the positions of the target worker recognized in the worker position recognition step into the prediction model to estimate a path of the target worker based on the plurality of positions of the target worker, to calculate a difference between data on the estimated path and preset normal path data of the target worker, to compare the calculated difference with a path threshold value that is preset, and, based on the comparison, to determine whether the estimated path of the target worker is a usual path or an unusual path;

a work start recognition step of recognizing, by the computer, from the acquired image data whether a work item has been started;

a work end recognition step of determining, by the computer, whether the work item has been ended based on the acquired image data; and an unusual work time period detection step of acquiring, by the computer, a work time period from a difference between a work start time point recognized in the work start recognition step and a work end time point recognized in the work end recognition step, comparing the acquired work time period with a work time threshold value that is preset, and, based on the comparison, determining whether the acquired work time period is a usual work time period or an unusual work time period;

wherein whether the work item has been started is determined from transition of feature quantities of individual images in a plurality of frames of past images, wherein whether the work item has been ended is determined from the transition of feature quantities of individual images in the plurality of frames of past images, wherein the work time period is sent with the recognized work start time point and the recognized work end time point over the network from the computer to a work time transaction display screen of a display, and wherein the work time transaction display screen displays the work time period based on the recognized work start time point and the recognized work end time point.

2. The method for work quality control according to claim 1, wherein the determination of unusualness is performed using an unusualness degree, and further comprising:

a step of displaying the unusualness degree.

3. The method for work quality control according to claim 1, further comprising:

defining a difference between the acquired work time period and the threshold value as an unusualness degree;

wherein the acquired work time period is a usual work time period if the unusualness degree is less than a certain value and the acquired work time period is an unusual work time period if the unusualness degree is greater than the certain value.

4. A method for work quality control of a target worker in work where repetitive operation is performed, the method comprising:

a prediction model construction step of acquiring, by a computer, a prediction model that is statistically constructed from past worker path data, including x-coordinates and y-coordinates of a center of gravity, a position of a head and a position of a joint of at least one past worker over at least one past path during at least one past work, past intermediate quality data of the at least one past work, and past final quality data of the at least one past work;

an image data acquisition step of acquiring image data, from a camera to the computer over a network, in which the target worker is captured performing the work, the image data including a plurality of frames;

a work start recognition step of recognizing, by the computer, from the acquired image data whether a work item has been started;

a work end recognition step of determining, by the computer, whether the work item has been ended based on the acquired image data; and an unusual work time period detection step of acquiring, by the computer, a work time period from a difference between a work start time point recognized in the work start recognition step and a work end time point recognized in the work end recognition step, comparing the acquired work time period with a work time threshold value that is preset, and, based on the comparison, determining whether the acquired work time period is a usual work time period or an unusual work time period;

wherein whether the work item has been started is determined from transition of feature quantities of individual images in a plurality of frames of past images, wherein whether the work item has been ended is determined from the transition of feature quantities of individual images in the plurality of frames of past images, wherein the work time period is sent with the recognized work start time point and the recognized work end time point over the network from the computer to a work time transaction display screen of a display, and wherein the work time transaction display screen displays the work time period based on the recognized work start time point and the recognized work end time point.

5. The method for work quality control according to claim 4, further comprising:

defining a difference between the acquired work time period and the threshold value as an unusualness degree;

wherein the acquired work time period is a usual work time period if the unusualness degree is less than a certain value and the acquired work time period is an unusual work time period if the unusualness degree is greater than the certain value.

6. The method for work quality control according to claim 5, further comprising:

calculating the unusualness degree; and displaying the unusualness degree on an unusualness degree transition display screen having a horizontal axis that represents processing time point or process ID (identification) and a vertical axis that represents the calculated unusualness degree.

7. The method for work quality control according to claim 6, further comprising:

displaying a work time transition having a horizontal axis that represents processing time point or process ID (identification) and a vertical axis that represents the acquired work time period taken in each work.

8. The method for work quality control according to claim 4, further comprising:

displaying a work time transition having a horizontal axis that represents processing time point or process ID (identification) and a vertical axis that represents the acquired work time period taken in each work.

* * * * *